United States Patent
Mondragon Sarmiento et al.

(10) Patent No.: US 6,315,351 B1
(45) Date of Patent: Nov. 13, 2001

(54) CABIN STRUCTURE FOR MEDIUM TRUCK AND TRUCK

(75) Inventors: Francisco Mondragon Sarmiento, Atizapan de Zaragoza; Roberto Miranda Guerrero, Naucelpan de Juarez; Alejandro Espinoza Ruiz, Hidalgo; Carlos Gonzales Guadarrama, Atizapan, de Zaragoza, all of (MX)

(73) Assignee: Consorcio G. Grupo, S.A. de C.V. (MX)

( * ) Notice: Subject to any disclaimer, the term of this patent is extended or adjusted under 35 U.S.C. 154(b) by 0 days.

(21) Appl. No.: 09/378,223

(22) Filed: Aug. 19, 1999

Related U.S. Application Data

(63) Continuation of application No. PCT/MX98/00005, filed on Feb. 13, 1998.

(30) Foreign Application Priority Data

Feb. 14, 1997 (MX) .................................................. 971179

(51) Int. Cl.⁷ .................................................. B62D 33/06
(52) U.S. Cl. .................................... 296/190.08; 180/89.19
(58) Field of Search ........................ 296/190.01, 190.08, 296/190.11, 190.1; 180/87.19

(56) References Cited

U.S. PATENT DOCUMENTS

| | | | |
|---|---|---|---|
| D. 145,414 | * 8/1946 | Allen | D12/96 |
| 3,055,699 | * 9/1962 | May | 296/190.08 |
| 4,978,163 | * 12/1990 | Savio | 296/190.08 |
| 5,769,486 | * 6/1998 | Novoa et al. | 296/210 |
| 5,863,093 | * 1/1999 | Novoa et al. | 296/190.01 |
| 6,012,765 | * 1/2000 | Novoa et al. | 296/190.08 |

FOREIGN PATENT DOCUMENTS

645341 * 11/1950 (GB) .

* cited by examiner

*Primary Examiner*—Dennis H. Pedder
*Assistant Examiner*—Patricia Engle
(74) *Attorney, Agent, or Firm*—Rader, Fishman & Grauer PLLC

(57) ABSTRACT

A modular space frame of a cabin that can be used without distinction in a medium, heavy, and tractor truck, which may be assembled in the same assembly line of any of these three types of trucks and with the same kind of tools is described. The cabin is formed by six main sub-assemblies defined as follows: (1 and 2) two side sets that correspond to the door ring frame of the left and right doors; (3) a rear section which is used to support and reinforce the rear panel once the cabin is lined on the outside with the truck body (skin); (4) a floor space frame made up by a central rear panel, two side panels and a transmission's cover (the set of the floor starts at the base of the rear panel and runs flat up to where the transmission's cover ends, from this point it tilts upwards until it reaches the cabin's front); (5) a front section, formed by a cowl which, jointly with the door ring frames and the roof's header, forms the windshield's frame; and (6) a roof section, which delimits the interior alongside the upper part and provides support to the vehicle's roof. The pieces of the cabin may be manufactured with diverse materials, such as high-resistant steel or aluminum, and are joined amongst them by resistance spot welding.

5 Claims, 5 Drawing Sheets

CABIN STRUCTURE FOR MEDIUM TRUCK AND TRUCK

This application is a contunation of International Application No. PCT/MX98/00005, filed on Feb. 13, 1998.

TECHNICAL FIELD RELATED TO THE INVENTION

The present invention is related to the assembly of parts for medium, heavy, and tractor trucks, and most particularly with the space frame of the convential truck cabin; the cabin forms the interior space which the truck operators occupy while driving the vehicle.

BACKGROUND

The space frame of the cabin for medium, heavy, and tractor truck subject matters of the present invention is designated as a modular type, since it is formed by sub-assembled pieces which, in the present case, are the same for medium, heavy, and tractor trucks. The cabin for medium, heavy, and tractor truck subject matters of the present invention may be assembled without distinction in the same assembly line for units class 6, 7, and 8, (the class corresponds to the SAE—Society of Automotive Engineering classification, which includes the vehicles mentioned herein), without the need to stop the assembly line and using the same tool set in both cases.

As a person skilled in the art already knows, medium and heavy trucks are those which, due to their construction, design and utilization are not used for hauling trailers, and the load they transport does not exceed 19 tons. Pursuant to the regulations of Mexico's Ministry of Communications and Transports and according to international standards, a medium truck is an automotive vehicle with a chassis built to transport goods, with a vehicular gross weight that ranges between 6,351 and 14,968 kilograms.

In contrast, a tractor truck is one which, due to its construction, design and use, is adequate to haul all kinds of trailers, and is designed to transport large weights for great distances along the highways. Pursuant to the regulations of Mexico's Ministry of Communications and Transports and according to international standards, a tractor truck is an automotive vehicle with two or three axles used to transport goods, be it by means of hauling trailers, semi-trailers or with an integrated equipment, with a vehicular gross weight of 14,969 kilograms or more.

Until now, the space frames of cabins for medium, heavy, and tractor trucks have been distinct and constructed separately, in different assembly lines, and using particular tools for each type of vehicle or in the same assembly line. This has meant that the production of the cabin for one kind of vehicle has had to be stopped in order to construct the cabin for another type of truck. Since the cabins do, however, have pieces in common, the system of constructing them in different assembly lines has generated down-time, as the construction of the cabin for one kind of vehicle is suspended to construct the cabin for another type of vehicle. Apart from using specific tools for each kind of vehicle and, of course, the personnel to construct and assemble the cabin required by each kind of vehicle. In sum, this means greater production expenses, more time used and fewer units produced, thus increasing the cost of cabin units. This is even more serious when there is only one assembly line and it is necessary to stop the manufacturing process of one cabin to construct the other.

Purposes

1. To provide the space frame of a cabin for medium, heavy, and tractor trucks.
2. To provide the space frame of a single cabin that can be used for medium, heavy, and tractor trucks.
3. To provide the space frame of a single cabin for medium, heavy, and tractor trucks that can be constructed in the same assembly line of each type of vehicle.
4. To provide the space frame of a single cabin for medium, heavy, and tractor trucks that can be manufactured with the same type of tools.
5. That the production of one type of cabin for one kind of vehicle does not stop in order to manufacture the cabin for another kind of vehicle.
6. To reduce expenses in time, money, personnel, and tools in the manufacture of the cabins required for medium, heavy, and tractor trucks.

DETAILED DESCRIPTION OF THE INVENTION

Figure 1:
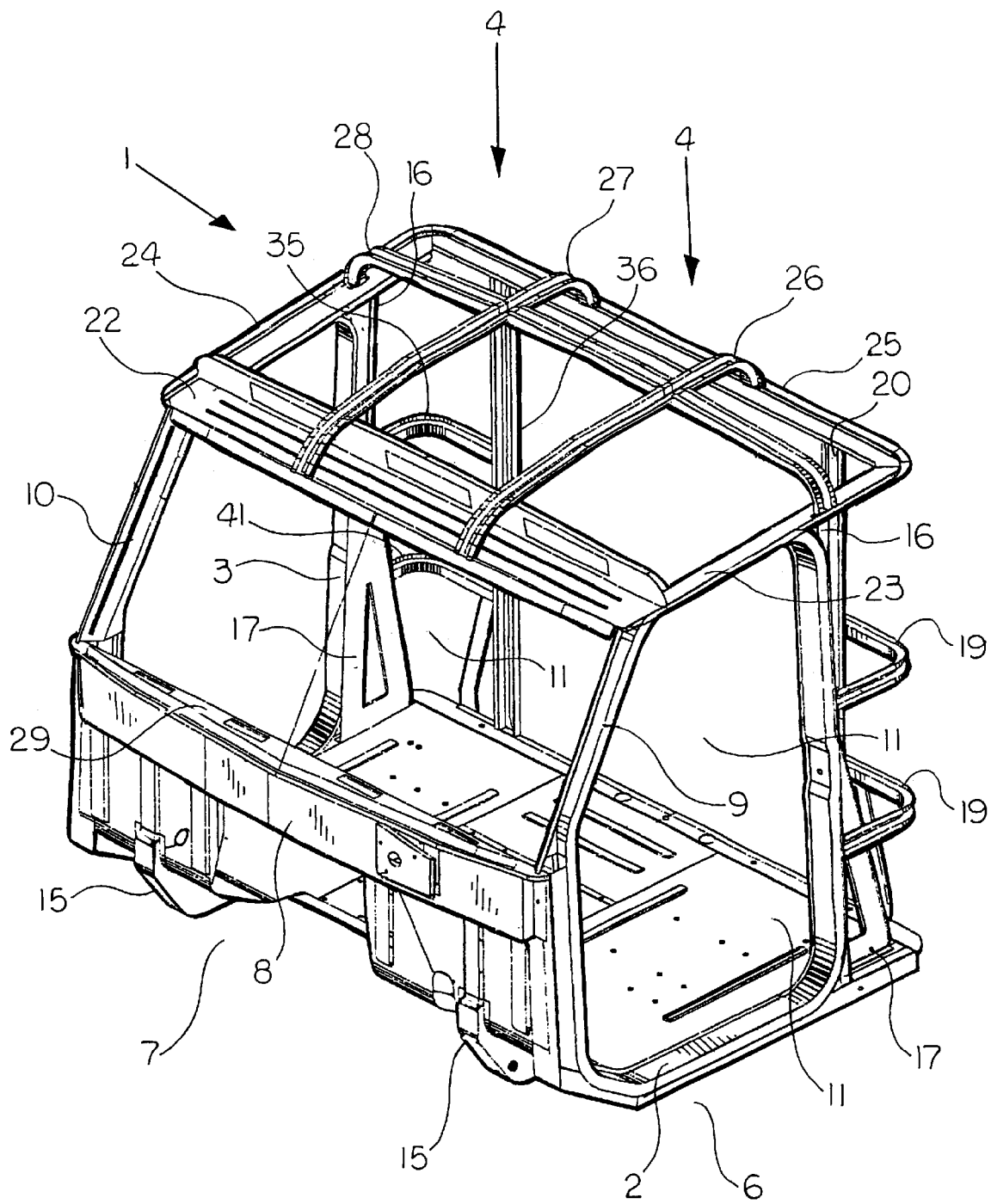
FIG. 1 depicts a perspective view of the space frame of the cabin for medium, heavy, and tractor truck.

The present invention is related to application Ser. No. 09/3,778,223, titled "Cab-over type cabin space frame for medium, heavy, and tractor truck".

The cabin for medium, heavy, and tractor truck subject matter of the present invention can be assembled without distinction in the same assembly line for different types of vehicles, without the need to stop the assembly line, and using the same tool set in both cases.

As a person skilled in the art already knows, a medium and heavy truck is one which, due to its construction, design and utilization, is not used for hauling trailers, and the load it transports does not exceed 19 tons. Pursuant to the regulations of the Ministry of Communications and Transports and, according to international standards, a medium truck is an automotive vehicle with a chassis built to transport goods, with a vehicular gross weight that ranges between 6,351 and 14,968 kilograms.

In contrast, a tractor truck is one which, due to its construction, design and use is adequate to haul all kinds of trailers and is designed to transport large weights through great distances along the highways. Pursuant to the regulations of Mexico's Ministry of Communications and Transports and according to international standards, a tractor truck is an automotive vehicle with two or three axles used to transport goods, be it by means of hauling trailers, semi-trailers or with an integrated equipment, with a vehicular gross weight of 14,969 kilograms or more.

As a rule, the space frames of the cabin for medium, heavy, and tractor trucks have been constructed separately in different assembly lines and using particular tools for each type of vehicle, or in the same assembly line, but this meant to stop the production of the cabin for one kind of vehicle to construct the cabin for other kind of vehicle. However, since both cabins have pieces in common, the fact of constructing them in different assembly lines results in down time since the construction of a cabin for one kind of vehicle is suspended for the construction of the cabin for other vehicle, apart from using specific tools for each kind of vehicle and of course the personnel to construct and assemble the cabin that each kind of vehicle requires; this means greater production expenses, more time used and less number of units produced, thus increasing the cost of said units. This is even more serious when there is only one assembly line and it is necessary to stop the manufacturing process of one cabin to construct another.

The space frame of the cabin for medium, heavy, and tractor truck subject matter of the present invention is designated as modular, since it is formed with sub-assembled pieces which, in the present case, are the same for medium, heavy, and tractor trucks. The space frame of the cabin for medium, heavy, and tractor truck is made from six sections; two side sections that make up the doors' ring frames, a rear or back section, a floor section, an upper section with respect to the top or roof and a front or forward section.

FIG. 1 depicts a perspective view of the cabin's space frame (1) for medium, heavy, and tractor truck, showing most of the parts that make it up. The side sections are constituted by the left door ring frame (2) and the right door ring frame (3). The door ring frames are closed space frames, continuous, having the appearance of a frame, which delimit and shape the doors; and are where the doors engage when closed once they have been installed in the vehicle. Each door ring frame (2) and (3) is fixed to a door ring frame reinforcement (16), which in turn has a back reinforcement (17), and therefore, there are two door ring frame reinforcements (16), one at the left side and other at the right side and two back reinforcements (17), also one in the left side and the other at the right side. The door ring frames (2) and (3), as well as the doors, are symmetrical and opposed to each other.

The rear section of the cabin is constructed of four quarter panel reinforcements, two located at the left, an upper one (19) and a lower one (18), and other two at the right, an upper one (35) and a lower one (41). The rear section includes two reinforcements for the rear panel, one at the back of the left side (20) and other at the back of the right side (36) and fixed to said quarter panel reinforcements. The quarter panel reinforcements (18), (19), (35) and (41) are curved metallic beams which shape and give support to the rear panels located in the back quarter panel reinforcements of the cabin.

The rear panels are not depicted in the figures since the figures show the space frame of the cabin, and the rear panels form the "skin" of the truck body placed over the space frame. In technical terms, it is said that the skin "lines" the cabin, i.e., it covers the space frame of the cabin, both inside and outside, to give the cabin the finish of the trucks' cabins we see everyday in streets and highways. Pillar "B" (skin) covers from the door ring frame's reinforcement (16) up to the rear panel reinforcements (20) and (36). The rear panel is a set of pieces that keep joined the left and right side parts, the roof and the floor, and it is where the rear glass window is located.

Figure 3:
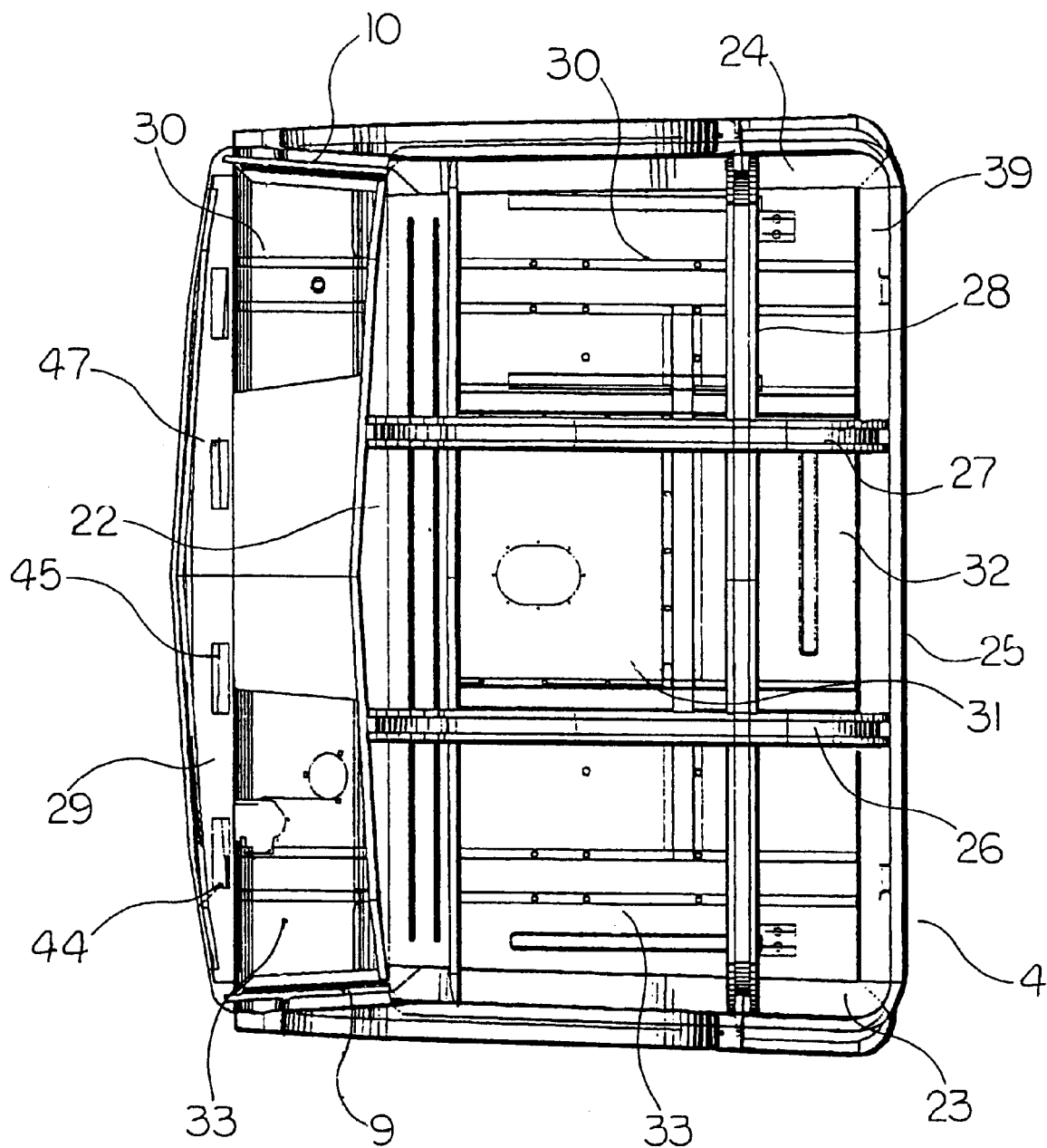
FIG. 3 depicts a top flat view of the space frame of the cabin for medium, heavy, and tractor truck.

The floor section may be observed in FIG. 3. The section of the floor's set (6) is made up by a right floor (30), a left floor (33), a rear central floor (32) and the transmission's cover (31). This floor's section (6) extends from the base of the rear panel (4) and to the cabin's front (7), starting from the side floor platforms, both the right one (30) and the left one (33) and the central one (32), which join to the transmission's cover (31), same that is located at the front of the rear central platform (32) and between the side platforms (30) and (33). Once the transmission's cover (31) is passed, the floor changes its trajectory and tilts upwards enough to be joined with the full cowl to form the cabin's front (7).

The front section (7) is formed by the full cowl reinforcement (29) which, in its upper part, is joined to the cowl (8), forming the firewall panel. By means of two posts, a right one (10) and a left one (9) assembled over the cowl (8), it is joined to the front upper part of the space frame of the roof or top (header) (22) of the cabin. The set formed by the cowl reinforcement (29), the posts (9) and (10) and the front upper part of the roof's space frame (22) form the frame of the truck's windshield. Once the cabin is lined on the outside, the part of the truck body located in both front corners is called pillar "A", the front side posts (9) and (10) are the framework of pillar "A".

The upper section formed by the top's set is formed by a header (22), two side header beams, a right one (24) and a left one (23) and a rear beam (25); this set forms a frame that delimits horizontally and alongside the periphery of the upper part of the interior's contour (11) or the habitable space inside the cabin. On this frame are found three beams or cross members. Two are situated from the rear to the front which divides the roof in three equal parts, one at the right (27) and the other at the left (26), parallel between them and placed on the back beam (25) and the header (22); the third beam is placed transversally (28) and joins the right side beam (24) of the header with the left side beam (23) of the header.

In the front section is found the cowl (8), and above it there is found the cowl's reinforcement (29) where four openings are located. In FIG. 3 these are identified from left to right, according to their location in the cabin's space frame (44), (45), (46) and (47) which are used for ventilation to defrost the windshield.

Figure 2:
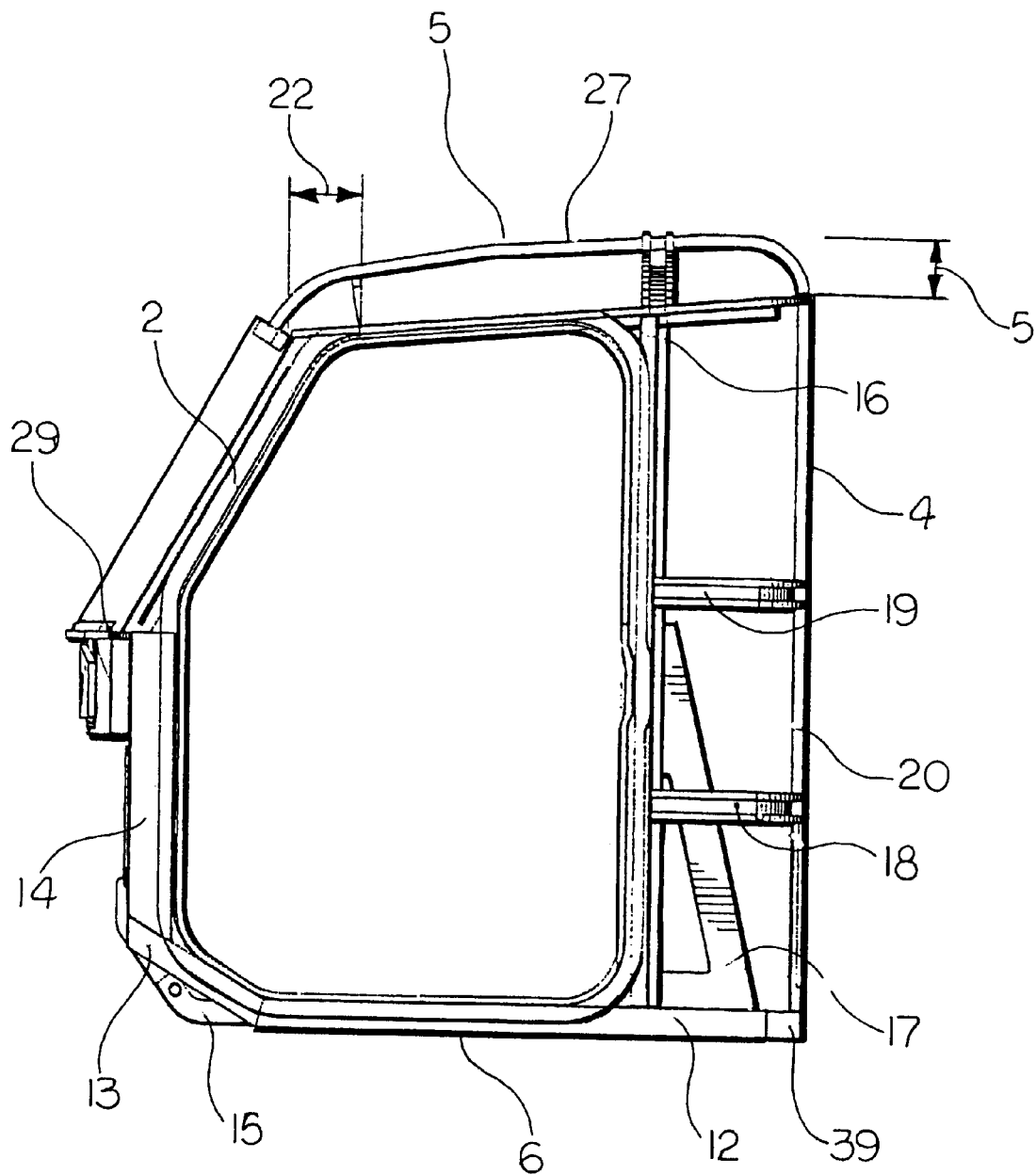
FIG. 2 depicts a left side flat view of the space frame of the cabin for medium, heavy, and tractor truck.

FIG. 2 depicts a left side view of the cabin's space frame (1), where it can be observed the profile of the cabin's space frame (1), which will be lined when the outer roof (5) is integrated therein and an outer rear panel (4). The lower part of the space frame of the cabin presents a rear transversal platform (39) joined to a lower side platform (12) which supports the cabin's space frame. The lower side platform (12) is joined to an intermediate side platform (13), which supports the floor's set (6) from the point where it tilts upwards, and is also used to support the front section of the cabin in a vertical position and, supported on the intermediate side platform (13) there is found an upper side platform (14). These platforms are joined one to the other with resistance spot welding. Also, the space frame has two front bearings (15) used to fix the space frame's front to the chassis.

FIG. 3 depicts a top view of the cabin's space frame, where the interior can be observed (11) which, apart from being the space occupied by the driver and his assistant, is also where accessories are found that make the truck useful for transportation. We consider as accessories the seats, steering wheel, dashboard with instruments, gearshift lever, floor mats and everything that is needed in the cabin to drive a truck and which do not belong directly to the space frame of the cabin, this is to say, the accessories to which we make reference herein are those attachments required to line the cabin on the inside.

Figure 4:
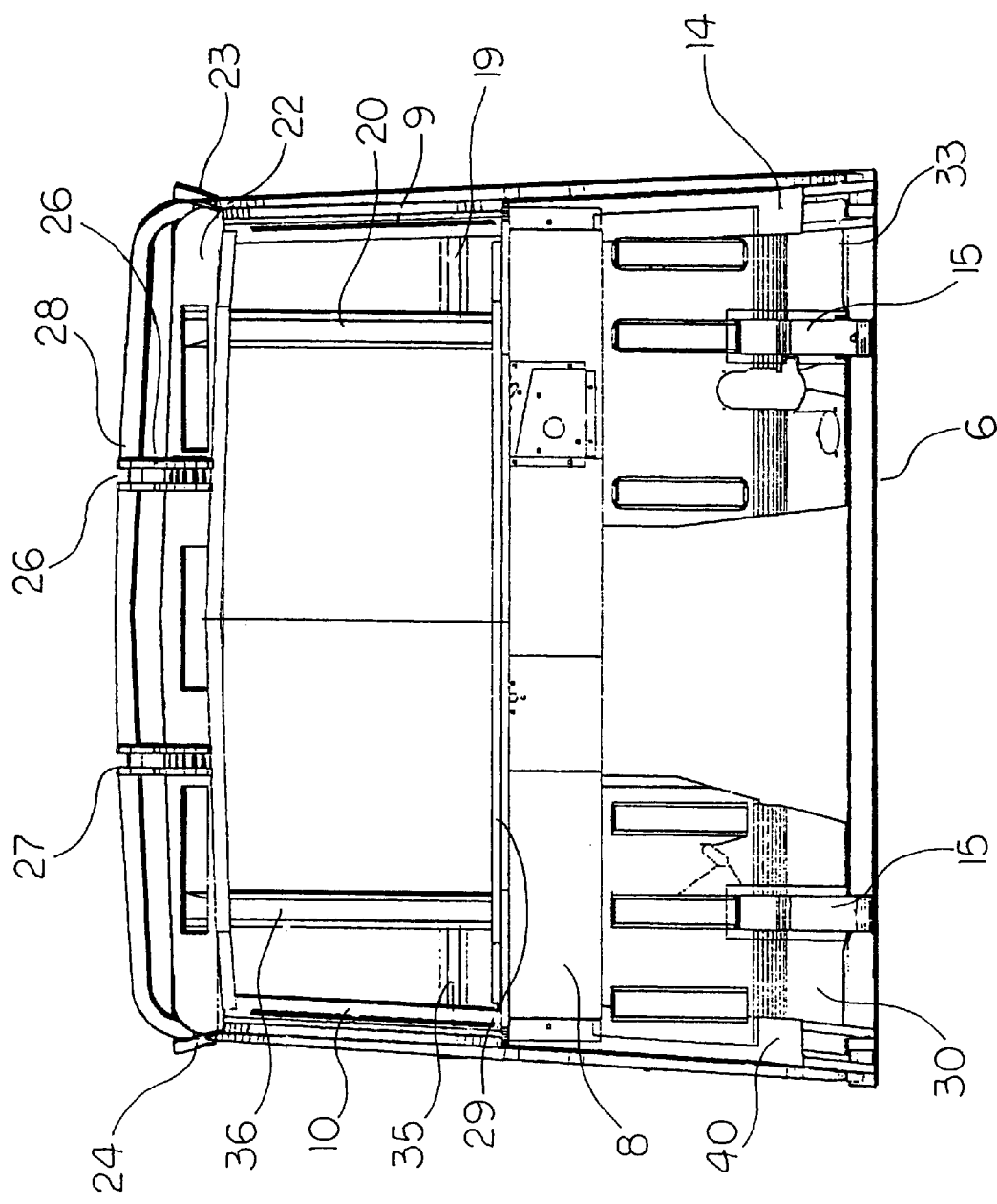
FIG. 4 depicts a front flat view of the space frame of the cabin for medium, heavy, and tractor truck.

FIG. 4 depicts the space frame of the cabin for truck seen from the front, where can be noted in particular the parts that make up the front section of the cabin's space frame.

Figure 5:
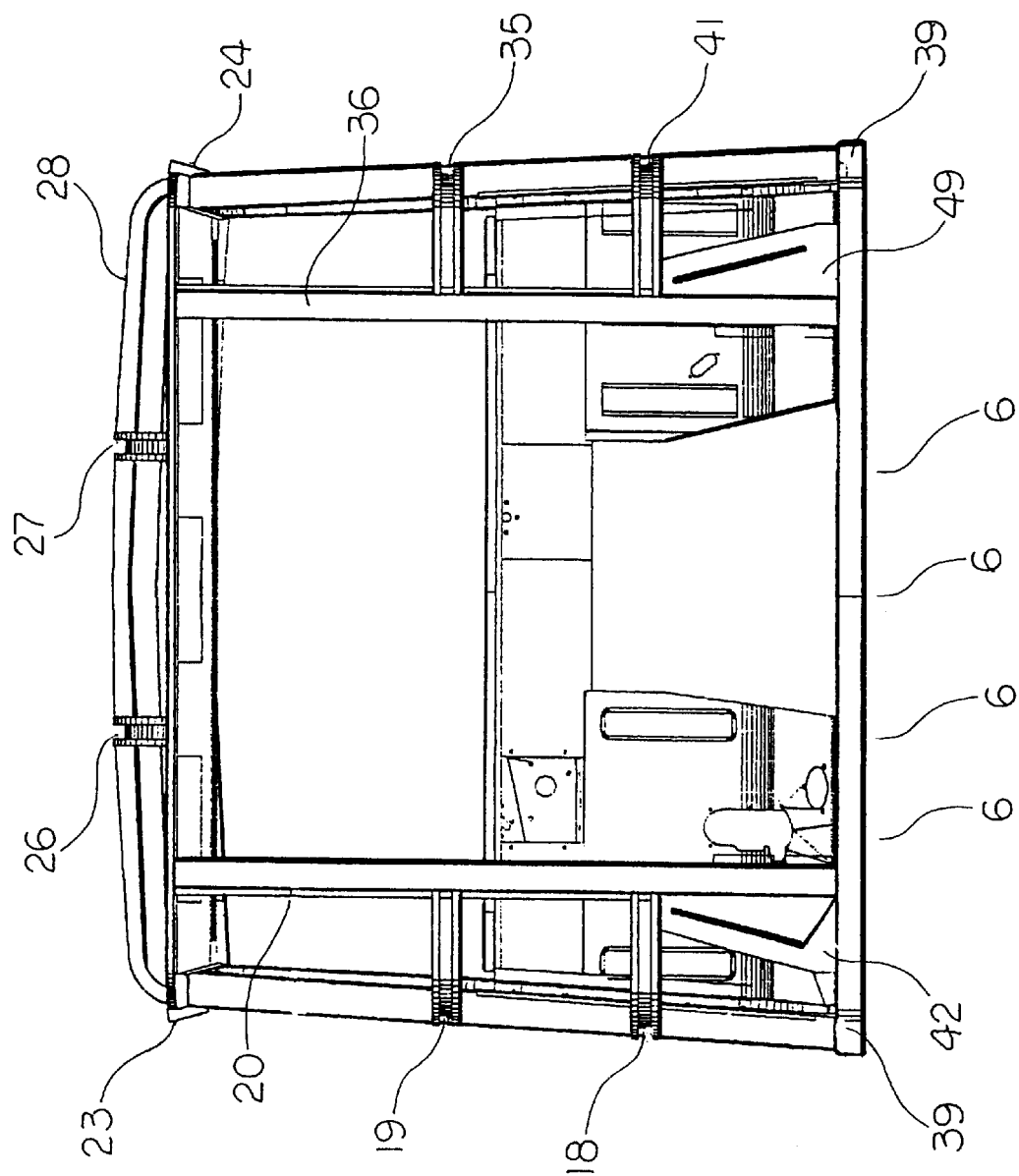
FIG. 5 depicts a back flat view of the space frame of the cabin for medium, heavy, and tractor truck.

FIG. 5 depicts the back part of the space frame of the cabin subject matter of the invention, where it can be observed two plates (48) and (49) of the panel's rear reinforcements (20) and (36), one at the left (48) and the other to the right (49); which are reinforcements that bear a trapezoidal shape; the left plate (48) reinforces the panel's rear reinforcement (20) and the cabin's base, and the right plate (49) reinforces the panel's rear reinforcement (36) and the cabin's base (39).

The pieces that make up the space frame of the cabin may be manufactured from metals such as high-resistant steel or aluminum. The pieces are molded with dies or standard tools; they have grooves to engage them and are fixed with resistance spot welding.

What is claimed is:

1. A space frame for a truck cabin comprising modular sections, wherein:
   two side sections, left and right, each comprising a door ring frame, a vertical reinforcement attached to a back vertical portion of the door ring frame, and a second reinforcement attached to lower back portion of the vertical reinforcement;
   a floor section comprising a rear transversal platform; a left and a right lower side platform, a left and a right intermediate side platform, a left and a right upper side platform, a floor set supported by the platforms,
     wherein the rear transversal platform is joined at its left and right ends to the left and right lower side platforms, respectively, each lower side platform is further joined to the side-respective intermediate side platform, each intermediate platform is further joined to the side-respective upper side platform; and
     wherein the floor set comprises a back central floor, a left side floor, a right side floor, and a transmission cover,
   a back section comprising horizontal quarter panel reinforcements at the lower left, the upper left, the lower right, and the upper right thereof, a vertical left section reinforcement, a right vertical reinforcement, a left plate, and a right plate,
     wherein the horizontal quarter panel reinforcements each attach respectively to the left and right side section vertical reinforcements and to the respective back section vertical reinforcements, left and right, and
     wherein the plates attach to the lower portions of the back section vertical reinforcements and to the rear transversal platform of the floor section;
   an upper section comprising a header, a right header beam, a left header beam, a back beam, a left roof beam, a right roof beam, and a transverse beam,
     wherein the ends of the left and right header beams each join the respective ends of both the header beam and the back beam so as to create the horizontal dimensions of a space frame interior,
     wherein the left roof beam and the right roof beam each join both the header beam and the back beam at points central from the ends of the header and back beams, and
     wherein the transverse beam joins both the left and right side header beams at points central from the ends of the left and right side header beams;
   a front section comprising a cowl, a cowl reinforcement, a left post, a right post,
     wherein the cowl and the cowl reinforcement are joined together to create a firewall,
     wherein the front section is joined to the front bearings of the floor section and,
     wherein the left and right posts are joined to the left and right ends, respectively, of the cowl reinforcement, and at their upper ends, to the left and right ends, respectively, of the roof's header.

2. A space frame for a truck cabin as in claim 1, wherein said floor section extends from the back platform of the rear panel forward to the transmission cover, where it tilts upward until it is joined to the cabin's front.

3. A space frame for a truck cabin as in claim 1, wherein the pieces comprising each modular section are manufactured from high resistance steel.

4. A space frame for a truck cabin as in claim 1, wherein the pieces comprising each modular section are manufactured from aluminum.

5. A space frame for a truck cabin as in claim 1, wherein the pieces comprising each modular section are molded with dies and have grooves with which to engage each other, and are fixed to each other by resistance spot welding.

* * * * *